US009331958B2

(12) United States Patent
Lie et al.

(10) Patent No.: US 9,331,958 B2
(45) Date of Patent: May 3, 2016

(54) DISTRIBUTED PACKET SWITCHING IN A SOURCE ROUTED CLUSTER SERVER

(71) Applicants: Sean Lie, Los Gatos, CA (US); Vikrama Ditya, Pleasanton, CA (US); Gary R. Lauterbach, Los Altos Hills, CA (US)

(72) Inventors: Sean Lie, Los Gatos, CA (US); Vikrama Ditya, Pleasanton, CA (US); Gary R. Lauterbach, Los Altos Hills, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 363 days.

(21) Appl. No.: 13/731,331

(22) Filed: Dec. 31, 2012

(65) Prior Publication Data

US 2014/0185611 A1    Jul. 3, 2014

(51) Int. Cl.
| | |
|---|---|
| *H04L 12/66* | (2006.01) |
| *H04L 12/947* | (2013.01) |
| *H04L 12/721* | (2013.01) |
| *H04L 12/931* | (2013.01) |
| *H04L 12/747* | (2013.01) |
| *H04L 12/741* | (2013.01) |

(52) U.S. Cl.
CPC ............... *H04L 49/25* (2013.01); *H04L 45/34* (2013.01); *H04L 49/356* (2013.01); *H04L 45/54* (2013.01); *H04L 45/66* (2013.01); *H04L 45/742* (2013.01)

(58) Field of Classification Search
CPC ....................................................... H04L 45/74
USPC ............................................................ 370/355
See application file for complete search history.

(56) References Cited

U.S. PATENT DOCUMENTS

| | | | |
|---|---|---|---|
| 7,925,802 B2 | 4/2011 | Lauterbach et al. | |
| 8,140,719 B2 | 3/2012 | Lauterbach et al. | |
| 8,762,125 B2 * | 6/2014 | Errickson et al. | 703/23 |
| 2010/0153965 A1 * | 6/2010 | Arimilli et al. | 718/105 |
| 2013/0198355 A1 * | 8/2013 | Kalyanaraman et al. | 709/223 |
| 2014/0101467 A1 * | 4/2014 | Jubran et al. | 713/310 |
| 2014/0189153 A1 * | 7/2014 | Morris | 709/238 |

* cited by examiner

*Primary Examiner* — Wei Zhao

(57) ABSTRACT

A cluster compute server includes nodes coupled in a network topology via a fabric that source routes packets based on location identifiers assigned to the nodes, the location identifiers representing the locations in the network topology. Host interfaces at the nodes may be associated with link layer addresses that do not reflect the location identifier associated with the nodes. The nodes therefore implement locally cached link layer address translations that map link layer addresses to corresponding location identifiers in the network topology. In response to originating a packet directed to one of these host interfaces, the node accesses the local translation cache to obtain a link layer address translation for a destination link layer address of the packet. When a node experiences a cache miss, the node queries a management node to obtain the specified link layer address translation from a master translation table maintained by the management node.

17 Claims, 9 Drawing Sheets

DISTRIBUTED PACKET SWITCHING IN A SOURCE ROUTED CLUSTER SERVER

BACKGROUND

1. Field of the Disclosure

The present disclosure relates generally to processing systems and more particularly to packet switching in a cluster server.

2. Description of the Related Art

Cluster servers (also commonly referred to as "cluster computers") are composed of a number of nodes linked together via a network fabric and which typically cooperate to perform shared tasks. Conventionally, the compute nodes of a cluster server are interconnected via a shared link layer, or "layer 2", switch that serves as the hub for all inter-node communications. The switch employs at least one port per compute node, and forwards packet traffic between the ports based on a single large unified routing table. However, as a single centralized switch is involved in conducting all traffic, this approach is susceptible to faults or device failure, and can serve as a latency and bandwidth bottleneck. Moreover, each switch in the network fabric stores the routing information for every path that traverses the switch, which leads to relatively large routing tables at each switch and thus limits the scalability of such networks. Also, as L2 Ethernet switch networks are conventionally constructed as a tree topology, the root switch node in the tree topology is often the bandwidth limiter, and thus the typical solution is to employ a very large and expensive root switch node.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENTS

Figure 1:
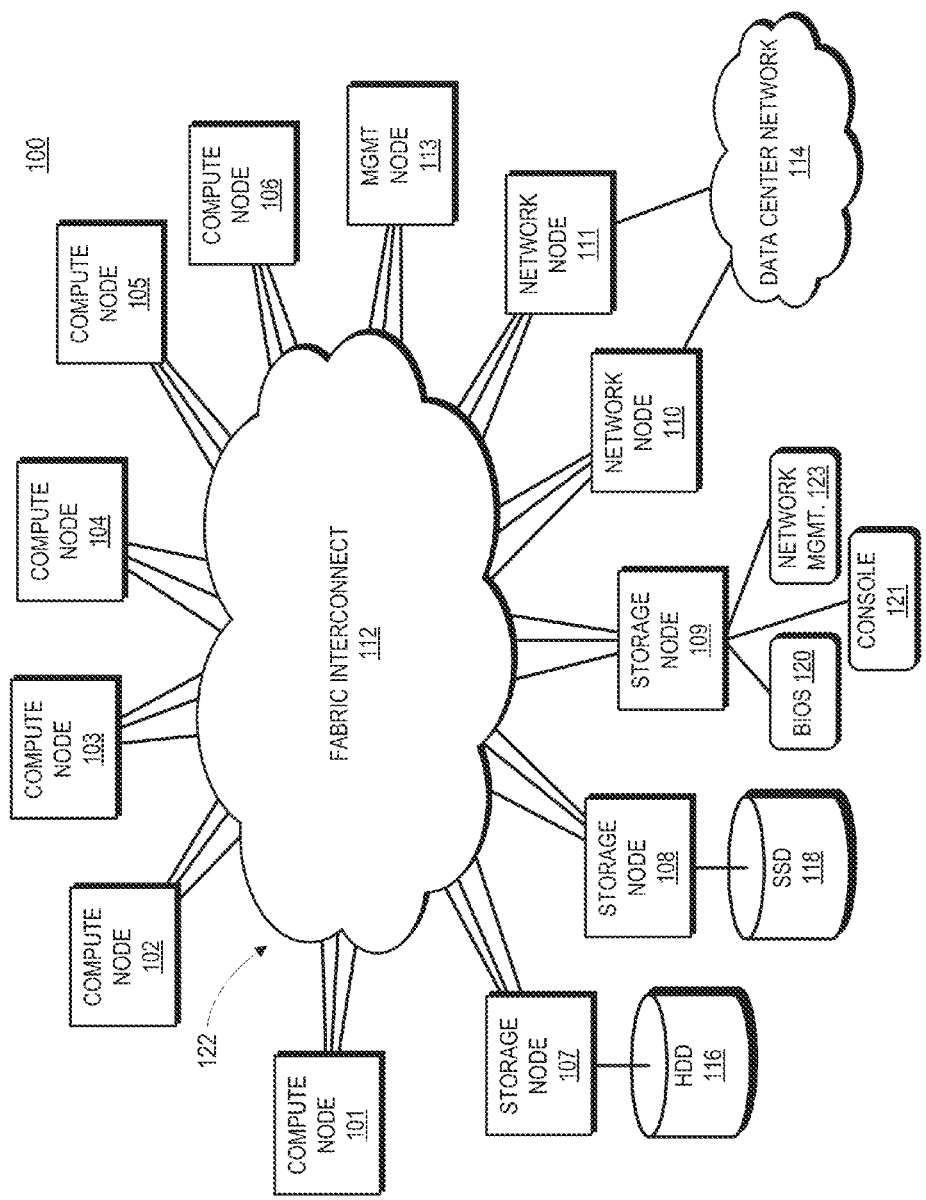
FIG. 1 is a block diagram of a cluster compute server in accordance with some embodiments.

FIGS. 1-10 illustrate a cluster compute server employing distributed packet switching in a fabric that interconnects nodes in a mesh network topology. In some embodiments, the fabric is a source routed fabric such that packets are routed over the fabric using deterministic routing paths. To illustrate, the mesh network topology can comprise a three-dimensional (3D) torus topology, and packets are routed over the fabric using a strict deterministic dimensional-order routing (that is, packets traverse completely in one dimension on the routing path between source node and destination node before moving to another dimension in the 3D torus). The location of each node in the mesh network topology is represented by a location identifier that also serves as a source routing control that specifies the source routed path between the source node and the destination node. The location identifiers can be implemented as, for example, media access control (MAC) addresses or other types of link layer addresses assigned to the node's network interface controllers (NICs) that interface with the interconnects of the fabric. As such, the control plane of the cluster compute server can assign a MAC address or other location identifier to a node based on its location in the mesh topology, and this MAC address also serves to control the source routing or to otherwise indicate the source routed path to be used in transporting packets to the node in the location associated with the MAC address. Link layer addresses of this type therefore are referred to herein as "source-route-control" or "SRC" link layer addresses, or in the case of MAC address implementation, SRC MAC addresses.

In some instances, the control plane of the cluster compute server may not have control over link layer addresses generated or used within the cluster compute server and thus the nodes may instantiate local host interfaces that do not have a SRC MAC address. To illustrate, the nodes of the cluster compute server may support virtualization whereby a virtual machine manager (VMM) virtualizes components of the hardware of a compute node (including the NIC of the compute node) so as to support one or more virtual machines (VMs) at the compute node. To facilitate network communications for the virtual machines of a compute node, the VMM or VM at the compute node can instantiate multiple virtual NICs (VNICs) to emulate the physical NIC of the compute node, with each VNIC serving a corresponding VM. Each VNIC typically is assigned its own MAC address by the VMM or VM, and in order to fully support commercially-available virtualization software products, the cluster compute server may permit the virtualization software to assign to the VNICs arbitrary MAC addresses that are not consistent with the network location identifying convention of the SRC MAC addresses assigned to the physical NICs of the nodes. As such, these arbitrarily-assigned MAC addresses do not directly control the source routing or otherwise indicate the source routed path to be used in transporting packets to the node in the location associated with the MAC address. Link layer addresses of this type therefore are referred to herein as "non-source-route-control," or "non-SRC", link layer addresses, or in the case of MAC address implementation, non-SRC MAC addresses.

In order to enable routing of packets having non-SRC destination MAC addresses within the fabric, some or all of the nodes employ a link layer switch that uses link layer address translation to identify the network location of the VNIC or other component associated with the non-SRC link layer address. However, rather than implement the same complete table of translations at each link layer switch, and thus consume excessive storage space at the link layer switch, each link layer switch employs a local cache that stores a subset of the link layer address translations for packet flows that originate from that particular link layer switch. Each link layer address translation maps a non-SRC link layer address to a corresponding location identifier for a location in the network topology of the cluster compute server. Thus, when a packet with a non-SRC link layer address is generated or otherwise originated at a link layer switch of a node, the link layer switch accesses the local cache to obtain the associated link layer address translation, and then uses this link layer address translation to identify the location identifier of the packet destination in the network and forward the packet to the appropriate egress port accordingly. Because of the routing within the fabric is deterministic, this translation need only occur at the source node of the packet, with the intermediary nodes source routing the packet to the destination node according to the mapped location identifier.

In some embodiments, the control plane or other management node maintains a master translation table of link layer address translations. Thus, when the local cache of a link layer switch does not include a needed link layer translation, the link layer switch can send a request for the link layer translation to the master translation table and then update its local cache with the link layer translation provided by the master translation table in response. Under this approach, the fabric can implement deterministic routing or source routing for packets while enabling transparent support for conventional virtualization software in a manner that does not require excessive address translation or mapping storage at the NIC of each node in the cluster compute server.

For ease of illustration, distributed source routed switching techniques are described in the example context of a cluster compute server as described below with reference to FIGS. 1-6. Examples of such servers include the SM10000 series or the SM15000 series of servers available from the SeaMicro™ division of Advanced Micro Devices, Inc. Although a general description is described below, additional details regarding embodiments of the cluster compute server are found in U.S. Pat. Nos. 7,925,802 and 8,140,719, the entireties of which are incorporated by reference herein. The techniques described herein are not limited to this example context, but instead may be implemented in any of a variety of servers. Moreover, while these techniques are described in the context of an Ethernet implementation employing MAC addresses, these techniques may be implemented in any of a variety of link layer protocols and addressing schemes.

FIG. 1 illustrates a cluster compute server 100 in accordance with some embodiments. The cluster compute server 100, referred to herein as "server 100", comprises a data center platform that brings together, in a rack unit (RU) system, computation, storage, switching, and server management. The server 100 is based on a parallel array of independent low power compute nodes (e.g., compute nodes 101-106), storage nodes (e.g., storage nodes 107-109), network nodes (e.g., network nodes 110 and 111), and management nodes (e.g., management node 113) linked together by a fabric interconnect 112, which comprises a high-bandwidth, low-latency supercomputer interconnect. Each node is implemented as a separate field replaceable unit (FRU) comprising components disposed at a printed circuit board (PCB)-based card or blade so as to facilitate efficient build-up, scaling, maintenance, repair, and hot swap capabilities.

The compute nodes operate to execute various software programs, including operating systems (OSs), hypervisors, virtualization software, compute applications, and the like. As with conventional server nodes, the compute nodes of the server 100 include one or more processors and system memory to store instructions and data for use by the one or more processors. However, unlike conventional server nodes, in some embodiments the compute nodes do not individually incorporate various local peripherals, such as storage, I/O control, and network interface cards (NICs). Rather, remote peripheral resources of the server 100 are shared among the compute nodes, thereby allowing many of the components typically found on a server motherboard, such as I/O controllers and NICs, to be eliminated from the compute nodes and leaving primarily the one or more processors and the system memory, in addition to a fabric interface device.

The fabric interface device, which may be implemented as, for example, an application-specific integrated circuit (ASIC), operates to virtualize the remote shared peripheral resources of the server 100 such that these remote peripheral resources appear to the OS executing at each processor to be located on corresponding processor's local peripheral bus. These virtualized peripheral resources can include, but are not limited to, mass storage devices, consoles, Ethernet NICs, Fiber Channel NICs, Infiniband™ NICs, storage host bus adapters (HBAs), basic input/output system (BIOS), Universal Serial Bus (USB) devices, Firewire™ devices, PCIe devices, user interface devices (e.g., video, keyboard, and mouse), and the like. This virtualization and sharing of remote peripheral resources in hardware renders the virtualization of the remote peripheral resources transparent to the OS and other local software at the compute nodes. Moreover, this virtualization and sharing of remote peripheral resources via the fabric interface device permits use of the fabric interface device in place of a number of components typically found on the server motherboard. This reduces the number of components implemented at each compute node, which in turn enables the compute nodes to have a smaller form factor while consuming less energy than conventional server blades which implement separate and individual peripheral resources.

The storage nodes and the network nodes (collectively referred to as "peripheral resource nodes") implement a peripheral device controller that manages one or more shared peripheral resources. This controller coordinates with the fabric interface devices of the compute nodes to virtualize and share the peripheral resources managed by the resource manager. To illustrate, the storage node 107 manages a hard disc drive (HDD) 116 and the storage node 108 manages a solid state drive (SSD) 118. In some embodiments, any internal mass storage device can mount any processor. Further, mass storage devices may be logically separated into slices, or "virtual disks", each of which may be allocated to a single compute node, or, if used in a read-only mode, shared by multiple compute nodes as a large shared data cache. The sharing of a virtual disk enables users to store or update common data, such as operating systems, application software, and cached data, once for the entire server 100. As another example of the shared peripheral resources managed by the peripheral resource nodes, the storage node 109 manages a remote BIOS 120, a console/universal asynchronous receiver-transmitter (UART) 121, and a data center management network 123. The network nodes 110 and 111 each manage one or more Ethernet uplinks connected to a data center network 114. The Ethernet uplinks are analogous to the uplink ports of a top-of rack switch and can be configured to connect directly to, for example, an end-of-row switch or core switch of the data center network 114. The remote BIOS 120 can be virtualized in the same manner as mass storage devices, NICs and other peripheral resources so as to operate as the local BIOS for some or all of the nodes of the server, thereby permitting such nodes to forgo implementation of a local BIOS at each node.

The fabric interface device of the compute nodes, the fabric interfaces of the peripheral resource nodes, and the fabric interconnect 112 together operate as a fabric 122 connecting the computing resources of the compute nodes with the peripheral resources of the peripheral resource nodes. To this end, the fabric 122 implements a distributed switching facility whereby each of the fabric interfaces and fabric interface devices comprises multiple ports connected to bidirectional links of the fabric interconnect 112 and operate as link layer switches to route packet traffic among the ports in accordance with deterministic routing logic implemented at the nodes of the server 100. Note that the term "link layer" generally refers to the data link layer, or layer 2, of the Open System Interconnection (OSI) model.

The fabric interconnect 112 can include a fixed or flexible interconnect such as a backplane, a printed wiring board, a motherboard, cabling or other flexible wiring, or a combination thereof. Moreover, the fabric interconnect 112 can include electrical signaling, photonic signaling, or a combination thereof. In some embodiments, the links of the fabric interconnect 112 comprise high-speed bi-directional serial links implemented in accordance with one or more of a Peripheral Component Interconnect—Express (PCIE) standard, a Rapid IO standard, a Rocket IO standard, a Hyper-Transport standard, a FiberChannel standard, an Ethernet-based standard, such as a Gigabit Ethernet (GbE) Attachment Unit Interface (XAUI) standard, and the like.

Although the FRUs implementing the nodes typically are physically arranged in one or more rows in a server box as described below with reference to FIG. 3, the fabric 122 can logically arrange the nodes in any of a variety of mesh topologies or other network topologies, such as a torus, a multi-dimensional torus (also referred to as a k-ary n-cube), a tree, a fat tree, and the like. For purposes of illustration, the server 100 is described herein in the context of a multi-dimensional torus network topology. However, the described techniques may be similarly applied in other network topologies using the guidelines provided herein.

Figure 2:
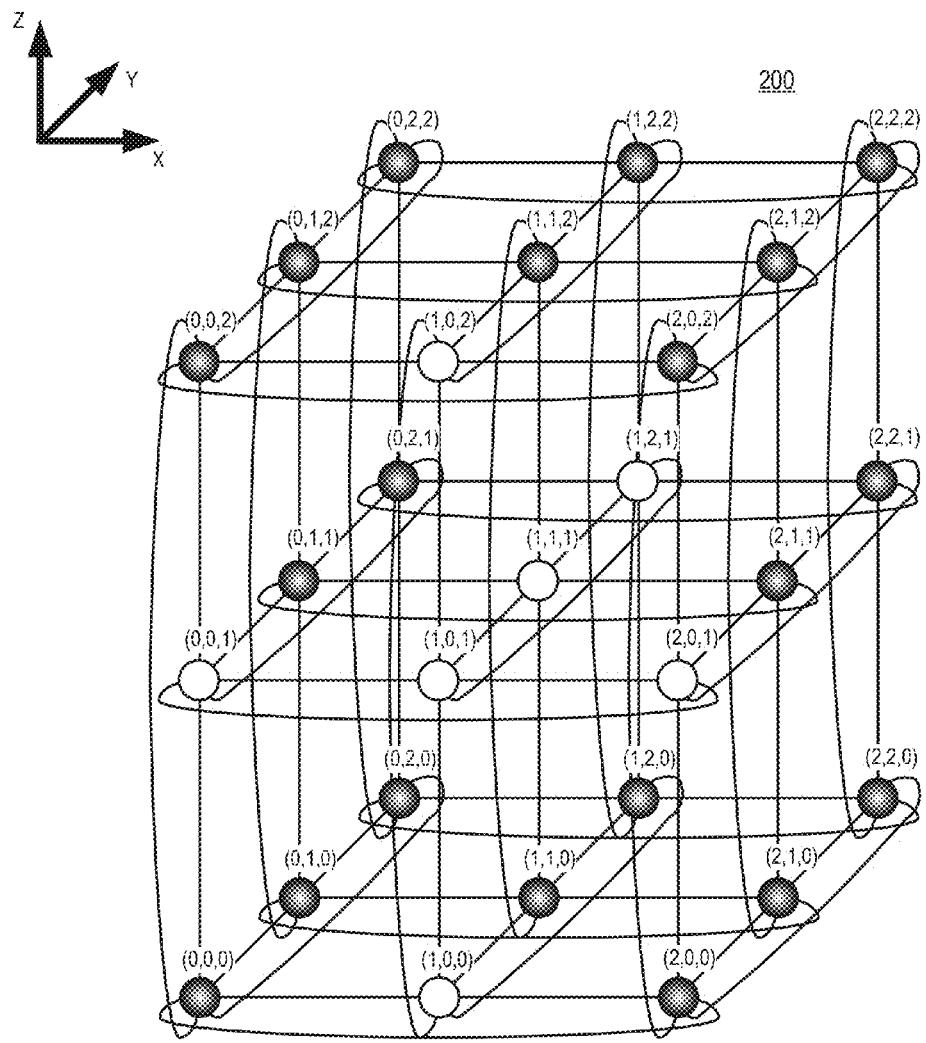
FIG. 2 is a block diagram illustrating an example network topology implemented for a cluster compute server in accordance with some embodiments.

FIG. 2 illustrates an example configuration of the server 100 in a network topology arranged as a k-ary n-cube, or multi-dimensional torus, in accordance with some embodiments. In the depicted example, the server 100 implements a three-dimensional (3D) torus network topology (referred to herein as "torus network 200") with a depth of three (that is, k=n=3). Accordingly, the server 100 implements a total of twenty-seven nodes arranged in a network of rings formed in three orthogonal dimensions (X,Y,Z), and each node is a member of three different rings, one in each of the dimensions. Each node is connected to up to six neighboring nodes via bidirectional serial links of the fabric interconnect 112 (see FIG. 1). The relative location of each node in the torus network 200 is identified in FIG. 2 by the position tuple (x,y,z), where x, y, and z represent the positions of the compute node in the X, Y, and Z dimensions, respectively. As such, the tuple (x,y,z) of a node also may serve as its address within the torus network 200, and thus serve as source routing control for routing packets to the destination node at the location represented by the position tuple (x,y,z). In some embodiments, one or more media access control (MAC) addresses can be temporarily or permanently associated with a given node. Some or all of such associated MAC address may directly represent the position tuple (x,y,z), which allows the location of a destination node in the torus network 200 to be determined and source routed based on the destination MAC address of the packet. As described in greater detail below, distributed look-up tables of MAC address to position tuple translations may be cached at the nodes to facilitate the identification of the position of a destination node based on the destination MAC address.

It will be appreciated that the illustrated X,Y, and Z dimensions represent logical dimensions that describe the positions of each node in a network, but do not necessarily represent physical dimensions that indicate the physical placement of each node. For example, the 3D torus network topology for torus network 200 can be implemented via the wiring of the fabric interconnect 112 with the nodes in the network physically arranged in one or more rows on a backplane or in a rack. That is, the relative position of a given node in the torus network 200 is defined by nodes to which it is connected, rather than the physical location of the compute node. In some embodiments, the fabric 122 (see FIG. 1) comprises a plurality of sockets wired together via the fabric interconnect 112 so as to implement the 3D torus network topology, and each of the nodes comprises a field replaceable unit (FRU) configured to couple to the sockets used by the fabric interconnect 112, such that the position of the node in torus network 200 is dictated by the socket into which the FRU is inserted.

In the server 100, messages communicated between nodes are segmented into one or more packets, which are routed over a routing path between the source node and the destination node. The routing path may include zero, one, or more than one intermediate node. As noted above, each node includes an interface to the fabric interconnect 112 that implements a link layer switch to route packets among the ports of the node connected to corresponding links of the fabric interconnect 112. In some embodiments, these distributed switches operate to route packets over the fabric 122 using source routing or a source routed scheme, such as a strict deterministic dimensional-order routing scheme (that is, completely traversing the torus network 200 in one dimension before moving to another dimension) that aids in avoiding fabric deadlocks. To illustrate an example of strict deterministic dimensional-order routing, a packet transmitted from the node at location (0,0,0) to location (2,2,2) would, if initially transmitted in the X dimension from node (0,0,0) to node (1,0,0) would continue in the X dimension to node (2,0,0), whereupon it would move in the Y plane from node (2,0,0) to node (2,1,0) and then to node (2,2,0), and then move in the Z plane from node (2,2,0) to node (2,2,1), and then to node (2,2,2). The order in which the planes are completely traversed between source and destination may be preconfigured and may differ for each node.

Moreover, as there are multiple routes between nodes in the torus network 200, the fabric 212 can be programmed for packet traffic to traverse a secondary path in case of a primary path failure. The fabric 212 also can implement packet classes and virtual channels to more effectively utilize the link bandwidth and eliminate packet loops, and thus avoid the need for link-level loop prevention and redundancy protocols such as the spanning tree protocol.

In some embodiments, certain types of nodes may be limited by design in their routing capabilities. For example, compute nodes may be permitted to act as intermediate nodes that exist in the routing path of a packet between the source node of the packet and the destination node of the packet, whereas peripheral resource nodes may be configured so as to act as only source nodes or destination nodes, and not as intermediate nodes that route packets to other nodes. In such scenarios, the routing paths in the fabric 122 can be configured to ensure that packets are not routed through peripheral resource nodes.

Various packet routing and techniques protocols may be implemented by the fabric 122. For example, to avoid the need for large buffers at switch of each node, the fabric 122 may use flow control digit ("flit")-based switching whereby each packet is segmented into a sequence of flits. The first flit, called the header flit, holds information about the packet's route (namely the destination address) and sets up the routing behavior for all subsequent flit associated with the packet. The header flit is followed by zero or more body flits, containing the actual payload of data. The final flit, called the tail flit, performs some bookkeeping to release allocated resources on the source and destination nodes, as well as on all intermediate nodes in the routing path. These flits then may be routed through the torus network 200 using cut-through routing, which allocates buffers and channel bandwidth on a packet level, or wormhole routing, which allocated buffers and channel bandwidth on a flit level. Wormhole routing has the advantage of enabling the use of virtual channels in the torus network 200. A virtual channel holds the state needed to coordinate the handling of the flits of a packet over a channel, which includes the output channel of the current node for the next hop of the route and the state of the virtual channel (e.g., idle, waiting for resources, or active). The virtual channel may also include pointers to the flits of the packet that are buffered on the current node and the number of flit buffers available on the next node.

Figure 3:
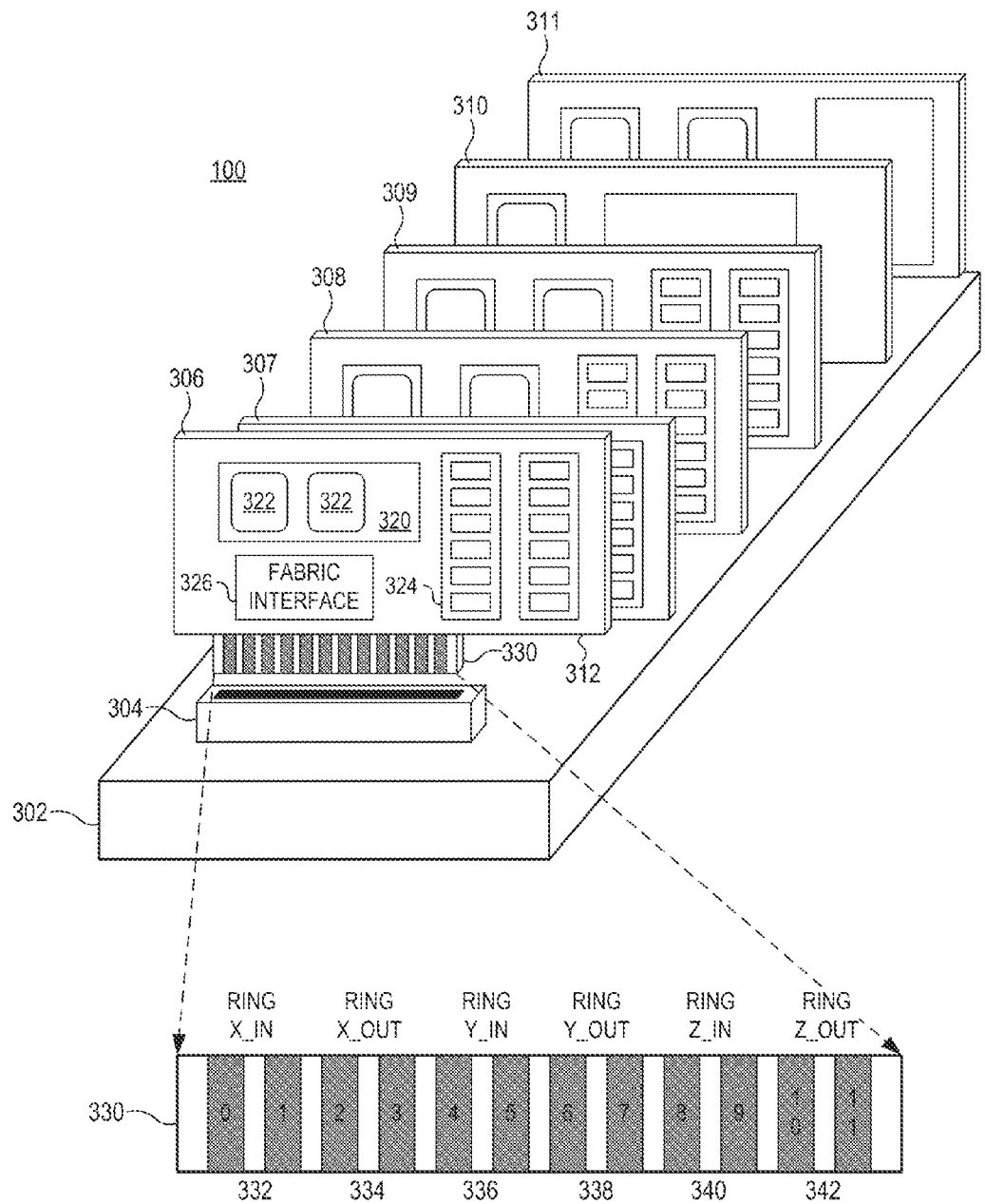
FIG. 3 is a block diagram illustrating an example physical arrangement of nodes of a cluster compute server in accordance with some embodiments.

FIG. 3 illustrates an example physical arrangement of nodes of the server 100 in accordance with some embodiments. In the illustrated example, the fabric interconnect 112 (FIG. 1) includes one or more interconnects 302 having one or more rows or other aggregations of plug-in sockets 304. The interconnect 302 can include a fixed or flexible interconnect, such as a backplane, a printed wiring board, a motherboard, cabling or other flexible wiring, or a combination thereof. Moreover, the interconnect 302 can implement electrical signaling, photonic signaling, or a combination thereof. Each plug-in socket 304 comprises a card-edge socket that operates to connect one or more FRUs, such as FRUs 306-311, with the interconnect 302. Each FRU represents a corresponding node of the server 100. For example, FRUs 306-309 may comprise compute nodes, FRU 310 may comprise a network node, and FRU 311 can comprise a storage node.

Each FRU includes components disposed on a PCB, whereby the components are interconnected via metal layers of the PCB and provide the functionality of the node represented by the FRU. For example, the FRU 306, being a compute node in this example, includes a PCB 312 implementing a processor 320 comprising one or more processor cores 322, one or more memory modules 324, such as DRAM dual inline memory modules (DIMMs), and a fabric interface device 326. Each FRU further includes a socket interface 330 that operates to connect the FRU to the interconnect 302 via the plug-in socket 304.

The interconnect 302 provides data communication paths between the plug-in sockets 304, such that the interconnect 302 operates to connect FRUs into rings and to connect the rings into a 2D- or 3D-torus network topology, such as the torus network 200 of FIG. 2. The FRUs take advantage of these data communication paths through their corresponding fabric interfaces, such as the fabric interface device 326 of the FRU 306. The socket interface 330 provides electrical contacts (e.g., card edge pins) that electrically connect to corresponding electrical contacts of plug-in socket 304 to act as port interfaces for an X-dimension ring (e.g., ring-X_IN port 332 for pins 0 and 1 and ring-X_OUT port 334 for pins 2 and 3), for a Y-dimension ring (e.g., ring-Y_IN port 336 for pins 4 and 5 and ring-Y_OUT port 338 for pins 6 and 7), and for an Z-dimension ring (e.g., ring-Z_IN port 340 for pins 8 and 9 and ring-Z_OUT port 342 for pins 10 and 11). In the illustrated example, each port is a differential transmitter comprising either an input port or an output port of, for example, a PCIE lane. A skilled artisan will understand that a port can include additional TX/RX signal pins to accommodate additional lanes or additional ports.

Figure 4:
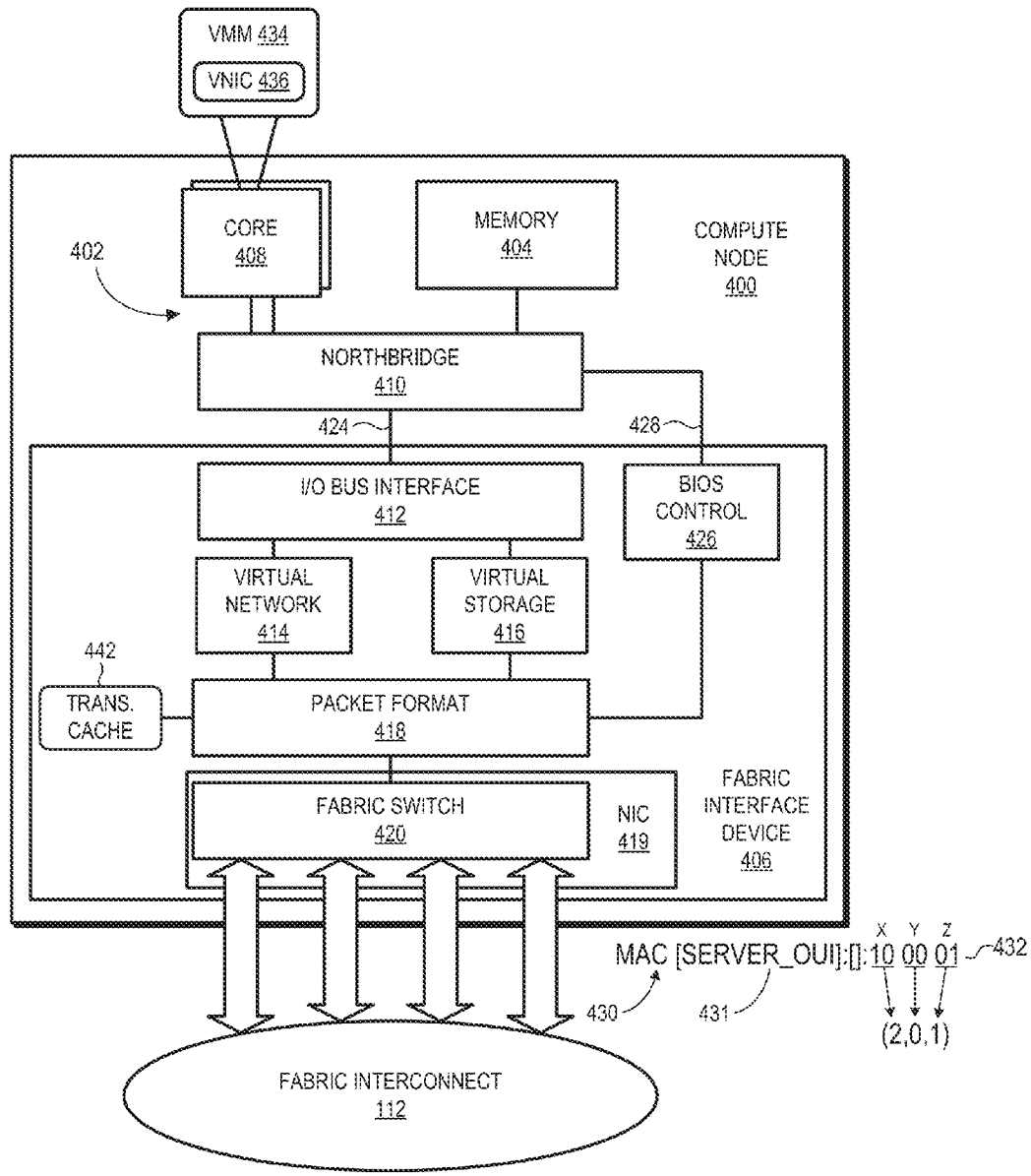
FIG. 4 is a block diagram illustrating an example implementation of a compute node of a cluster compute server in accordance with some embodiments.

FIG. 4 illustrates a compute node 400 implemented in the server 100 of FIG. 1 in accordance with some embodiments. The compute node 400 corresponds to, for example, one of the compute nodes 101-106 of FIG. 1. In the depicted example, the compute node 400 includes a processor 402, system memory 404, and a fabric interface device 406 (representing the processor 320, system memory 324, and the fabric interface device 326, respectively, of FIG. 3). The processor 402 includes one or more processor cores 408 and a northbridge 410. The one or more processor cores 408 can include any of a variety of types of processor cores, or combination thereof, such as a central processing unit (CPU) core, a graphics processing unit (GPU) core, a digital signal processing unit (DSP) core, and the like, and may implement any of a variety of instruction set architectures, such as an x86 instruction set architecture or an Advanced RISC Machine (ARM) architecture. The system memory 404 can include one or more memory modules, such as DRAM modules, SRAM modules, flash memory, or a combination thereof. The northbridge 410 interconnects the one or more cores 408, the system memory 404, and the fabric interface device 406. The fabric interface device 406, in some embodiments, is implemented in an integrated circuit device, such as an application-specific integrated circuit (ASIC), a field-programmable gate array (FPGA), mask-programmable gate arrays, programmable logic, and the like.

In a conventional computing system, the northbridge 410 would be connected to a southbridge, which would then operate as the interface between the northbridge 410 (and thus the processor cores 208) and one or local more I/O controllers that manage local peripheral resources. However, as noted above, in some embodiments the compute node 400 does not maintain local peripheral resources or their I/O controllers, and instead uses shared remote peripheral resources at other nodes in the server 100. To render this arrangement transparent to software executing at the processor 402, the fabric interface device 406 virtualizes the remote peripheral resources allocated to the compute node such that the hardware of the fabric interface device 406 emulates a southbridge and thus appears to the northbridge 410 as a local southbridge connected to local peripheral resources.

To this end, the fabric interface device 406 includes an I/O bus interface 412, a virtual network controller 414, a virtual storage controller 416, a packet formatter 418, and a NIC 419 comprising a fabric switch 420. The I/O bus interface 412 connects to the northbridge 410 via a local I/O bus 424 and acts as a virtual endpoint for each local processor core 408 by intercepting requests addressed to virtualized peripheral resources that appear to be on the local I/O bus 424 and responding to the requests in the same manner as a local peripheral resource, although with a potentially longer delay due to the remote location of the peripheral resource being virtually represented by the I/O bus interface 412.

While the I/O bus interface 412 provides the physical interface to the northbridge 410, the higher-level responses are generated by the virtual network controller 414 and by the virtual storage controller 416. Requests sent over I/O bus 424 for a network peripheral connected to an external network, such as an Ethernet NIC connected to the data center network 114 (FIG. 1), are routed by the I/O bus interface 412 to the virtual network controller 414, while storage requests are routed by the I/O bus interface 412 to the virtual storage controller 416. The virtual network controller 414 provides processing of incoming and outgoing requests based on, for example, an Ethernet protocol. The virtual storage controller provides processing of incoming and outgoing requests based on, for example, a serial ATA (SATA) protocol, a serial attached SCSI (SAS) protocol, a Universal Serial Bus (USB) protocol, and the like.

After being processed by either the virtual network controller 414 or the virtual storage controller 416, requests are forwarded to the packet formatter 418, which encapsulates the request into one or more packets. The packet formatter 418 then determines the fabric address or other location identifier of the peripheral resource node managing the physical peripheral resource intended for the request. The packet formatter 418 adds the identified fabric address (referred to herein as the "fabric ID") to the headers of the one or more packets in which the request is encapsulated and provides the packets to the fabric switch 420 of the NIC 419 for transmission.

As illustrated, the fabric switch 420 implements a plurality of ports, each port interfacing with a different link of the fabric interconnect 112. To illustrate using the 3×3 torus network 200 of FIG. 2, assume the compute node 400 represents the node at (1,1,1). In this example, the fabric switch 420 would have at least seven ports to couple it to seven bi-directional links: an internal link to the packet formatter 418; an external link to the node at (0,1,1); an external link to the node at (1,0,1), an external link to the node at (1,1,0), an external link to the node at (1,2,1), an external link to the node at (2,1,1), and an external link to the node at (1,1,2). Control of the switching of data among the ports of the fabric switch 420 is determined based on integrated deterministic switching logic, which specifies the egress port based on the destination address (that is, destination fabric ID) indicated by the packet and based on the deterministic routing implemented in the server 100.

For responses to outgoing requests and other incoming requests (e.g., requests from other compute nodes or from peripheral resource nodes), the process described above is reversed. The fabric switch 420 receives an incoming packet and routes the incoming packet to the port connected to the packet formatter 418 based on the deterministic routing logic. The packet formatter 418 then deencapsulates the response/request from the packet and provides it to either the virtual network controller 414 or the virtual storage controller 416 based on a type-identifier included in the request. The controller receiving the request then processes the response/request and controls the I/O bus interface 412 to signal the request to the northbridge 410, whereupon the response/request is processed as though it were a response or request from a local peripheral resource.

For a transitory packet for which the compute node 400 is an intermediate node in the routing path for the packet, the fabric switch 420 determines the destination address (e.g., the tuple (x,y,z)) from the header of the transitory packet, and provides the packet to a corresponding output port identified by the deterministic routing logic.

The NIC 419 of each compute node 400 is assigned a unique SRC MAC address 430 that includes an organizationally unique identifier (OUI) field 431 and a NIC-specific field 432. The value stored in the OUI field 431 is common to the SRC MAC address of each NIC 419, and thus this value identifies the MAC address as a SRC MAC address. The NIC-specific field 432 is used to store a value indicative of the location of the compute node 400 in the network topology of the server 100. To illustrate using the 3D torus network 200 of FIG. 2, the NIC-specific field 432 includes a value that represents the position tuple (x,y,z) identifying the location of the compute node 400 at position x in the X dimension, position y in the Y dimension, and position z in the Z dimension in a 3D torus network topology. In the 3×3×3 example of FIG. 2, this value can comprise a six bit value, with the first two-bit subset representing x, the second two-bit subset representing y, and the third two-bit subset representing z. For example, assume that the compute node 400 is located in the torus network 200 at location (2,0,1). In this example, the control plane of a management node of the server 100 would assign to the NIC 419 a SRC MAC address with a bit value of 10 00 01b for its last six bits so as to represent its location as tuple (2,0,1). In a 4×4×4 example of a 3D torus, the MAC address assigned the NIC 419 could use the last twelve bits to represent the position tuple (x,y,z) of the compute node 400.

As noted above, the fabric 122 (FIG. 1) of the server 100 can comprise a source routed fabric whereby the routing path between a source node and a destination node is deterministic, and thus the location indicated by the NIC-specified field 432 in the SRC MAC address 430 also directly specifies or controls the particular routing path to be used for routing the packet to the node having the SRC MAC address 430. Thus, for packets having SRC MAC addresses as the destination MAC address, the fabric switch 420 can use the location identifier references in the NIC-specified field 432 in the SRC MAC address to identify the appropriate egress port and forward the packet to the identified egress port accordingly.

In some embodiments, the compute node 400 supports the assignment or association of non-SRC MAC addresses to host interfaces at a node. To illustrate, the compute node 400 can support virtualization whereby a virtual machine manager (VMM) may be implemented by, or in conjunction with, an operating system (OS) at the processor 402 to virtualize hardware components of the compute node 400 (including the NIC 119) so as to support one or more virtual machines (VMs) at the compute node 400. Each VM may execute one or more low-level applications (e.g., driver applications) or high-level applications (e.g., a guest OS or a user-level application), some or all of which may be involved in one or more data flows with other applications on other compute nodes.

To facilitate network communications for the VMs, the VMs or VMM can instantiate multiple virtual NICs (VNICS) to emulate the physical NIC 419. A VNIC may be instantiated on a per-VM basis, on a per-application basis, or on a per-data flow basis. For example, the VMM may instantiate a VNIC 436 for the data flows of a VM 434. The instantiated VNIC typically is a software-manifested interface between the physical NIC 419 and the VMs or their applications, whereby each VNIC is assigned its own unique address (e.g., a MAC address) and the VMM implements driver software to act as a bridge between the physical NIC 419 and the VNIC. Data from a VM is packetized by the corresponding VNIC (including the address of the VNIC as the source address), and the resulting packets are provided by the VNIC/VMM to the physical NIC 419 for transmission. Similarly, data transmitted to the node implementing the VM is packetized by the transmitting component (including the address of the VNIC for the VM as the destination address) and the resulting packets are provided by the other node to the fabric 122 for transmission.

In some embodiments, the network configuration of the server 100 is transparent to the software executed at the processor 402 and thus the virtualization software may not be required to adhere to the same MAC addressing conventions as applied to the physical NICs 419. Thus, the MAC address assigned to a VNIC instantiated at the compute node 400 may be arbitrary and thus have no direct representation of the location of the compute node 400 in the network topology of the fabric 122 or direct control over the routing path used to route packets through the fabric 122 to the node implementing the VNIC. Likewise, arbitrary MAC addresses (that is, not location-specific MAC addresses) may be assigned at the compute node 400 for various other reasons.

Thus, the server 100 may support two types of destination MAC addresses: SRC destination MAC addresses, and non-SRC destination MAC addresses. However, as non-SRC destination MAC addresses do not directly indicate the source routing control or fixed route for the corresponding packet, the compute node 400, when originating a packet having a non-SRC destination MAC, determines a fabric location identifier, or "fabric ID", that identifies the network location of the destination node, and uses this fabric ID to source route the packet along a specified fixed route to the destination node. To this end, the packet formatter 418 employs a local translation cache 442 that stores MAC address translations that represent mappings of non-SRC MAC addresses used in the fabric 122 to SRC MAC addresses. Thus, when the packet formatter 418 receives a packet with a non-SRC MAC address as the packet's destination address from the I/O bus interface 412, the packet formatter 418 accesses the local translation cache 442 to determine the SRC MAC address representing the location of the compute node hosting the non-SRC MAC address, inserts the identified SRC MAC address into a fabric header of the packet, and then forwards the packet to the fabric switch 420, which then forward the packet to an egress port selected based on this mapped SRC MAC address and the deterministic routing logic employed by the fabric switch 420. Under this approach, the compute node 400 need only track the non-SRC MAC address-to-fabric ID translations for destinations with which the host processor 402 is communicating. The local translation cache 442 therefore does not need to contain translations for packets that are merely passing through the fabric switch 420, and thus the local translation cache 442 maintained at the compute node 400 is relatively small, particularly compared to the total number of translations likely to be in the server 100. This relatively small local translation facility enables scalability of the network of the server 100. This local caching of link layer address translations is described in greater detail below with reference to FIGS. 7-9.

As noted above, the BIOS likewise can be a virtualized peripheral resource. In such instances, the fabric interface device 406 can include a BIOS controller 426 connected to the northbridge 410 either through the local I/O bus 424 or via a separate low pin count (LPC) bus 428. As with storage and network resources, the BIOS controller 426 can emulate a local BIOS by responding to BIOS requests from the northbridge 410 by forwarding the BIOS requests via the packet formatter 418 and the fabric switch 420 to a peripheral resource node managing a remote BIOS, and then providing the BIOS data supplied in turn to the northbridge 410.

Figure 5:
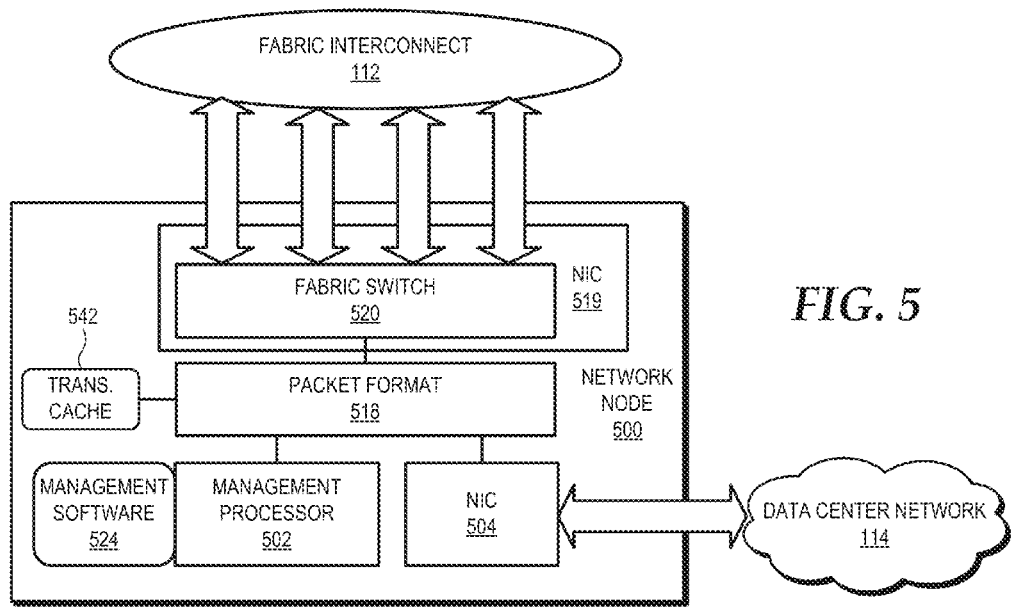
FIG. 5 is a block diagram illustrating an example implementation of a network node of a cluster compute server in accordance with some embodiments.

FIG. 5 illustrates a network node 500 implemented in the server 100 of FIG. 1 in accordance with some embodiments. The network node 500 corresponds to, for example, network nodes 110 and 111 of FIG. 1. In the depicted example, the network node 500 includes a management processor 502, an uplink NIC 504 connected to, for example, an external Ethernet network such as the data center network 114, a packet formatter 518, and a fabric-side NIC 519, which includes a fabric switch 520. As with the fabric switch 420 of FIG. 4, the fabric switch 520 operates to switch incoming and outgoing packets among its plurality of ports based on a local distributed routing table 522. The packet formatter 518 may employ a local translation cache 542 to enable non-SRC MAC address to SRC MAC address translation as described above and as described in greater detail below.

A packetized incoming request intended for the uplink NIC 504 (which is virtualized to appear to the processor 402 of a compute node 400 as a local NIC) is intercepted by the fabric switch 520 from the fabric interconnect 112 and routed to the packet formatter 518, which deincapsulates the packet and forwards the request to the uplink NIC 504. The uplink NIC 504 then performs the one or more operations dictated by the request. Conversely, outgoing messages from the uplink NIC 504 are encapsulated by the packet formatter 518 into one or more packets, and the packet formatter 518 determines the destination address and inserts the destination address into the header of the outgoing packets. The outgoing packets are then switched to the port associated with the link in the fabric interconnect 112 connected to the next node in the source routed path between the network node 500 and the intended destination node.

The management processor 502 executes management software 524 stored in a local storage device (e.g., firmware ROM or flash memory) to provide various management functions for the server 100. These management functions can include maintaining a centralized master link layer address translation table and distributing portions thereof to the local translation caches of individual nodes. Further, the management functions can include link aggregation techniques, such implementation of IEEE 802.3ad link aggregation, and media access control (MAC) aggregation and hiding.

Figure 6:
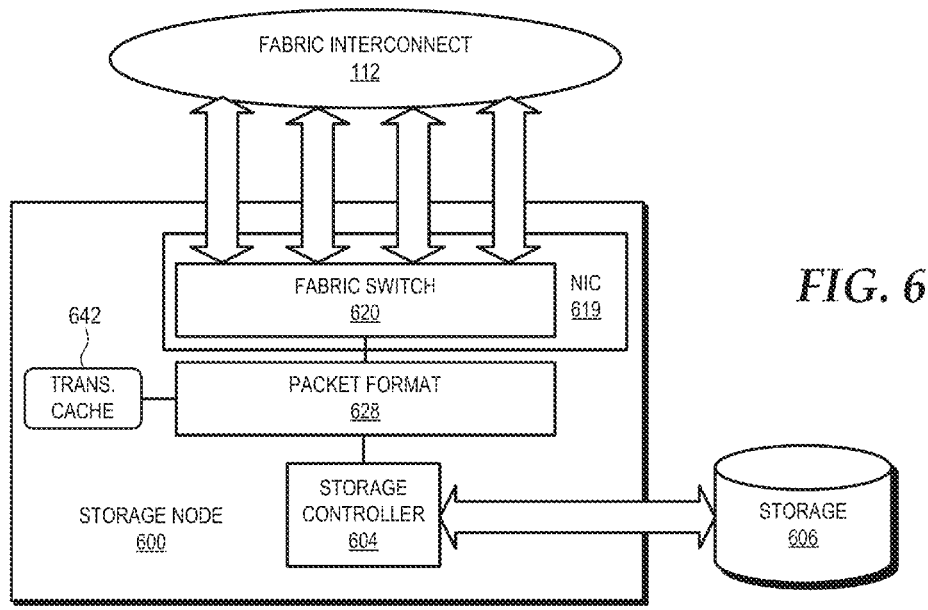
FIG. 6 is a block diagram illustrating an example implementation of a storage node of a cluster compute server in accordance with some embodiments.

FIG. 6 illustrates a storage node 600 implemented in the server 100 of FIG. 1 in accordance with some embodiments. The storage node 600 corresponds to, for example, storage nodes 107-109 of FIG. 1. As illustrated, the storage node 600 is configured similar to the network node 500 of FIG. 5 and includes a NIC 619 having a fabric switch 620, a packet formatter 618, and a local translation cache 642, which operate in the manner described above with reference to the fabric switch 520, the packet formatter 518, and the local translation cache 642 of the network node 500 of FIG. 5. However, rather than implementing a NIC, the storage node 600 implements a storage device controller 604, such as a SATA controller. A depacketized incoming request is provided to the storage device controller 604, which then performs the operations represented by the request with respect to a mass storage device 606 or other peripheral device (e.g., a USB-based device). Data and other responses from the peripheral device are processed by the storage device controller 604, which then provides a processed response to the packet formatter 618 for packetization and transmission by the fabric switch 620 to the destination node via the fabric interconnect 112.

Figure 7:
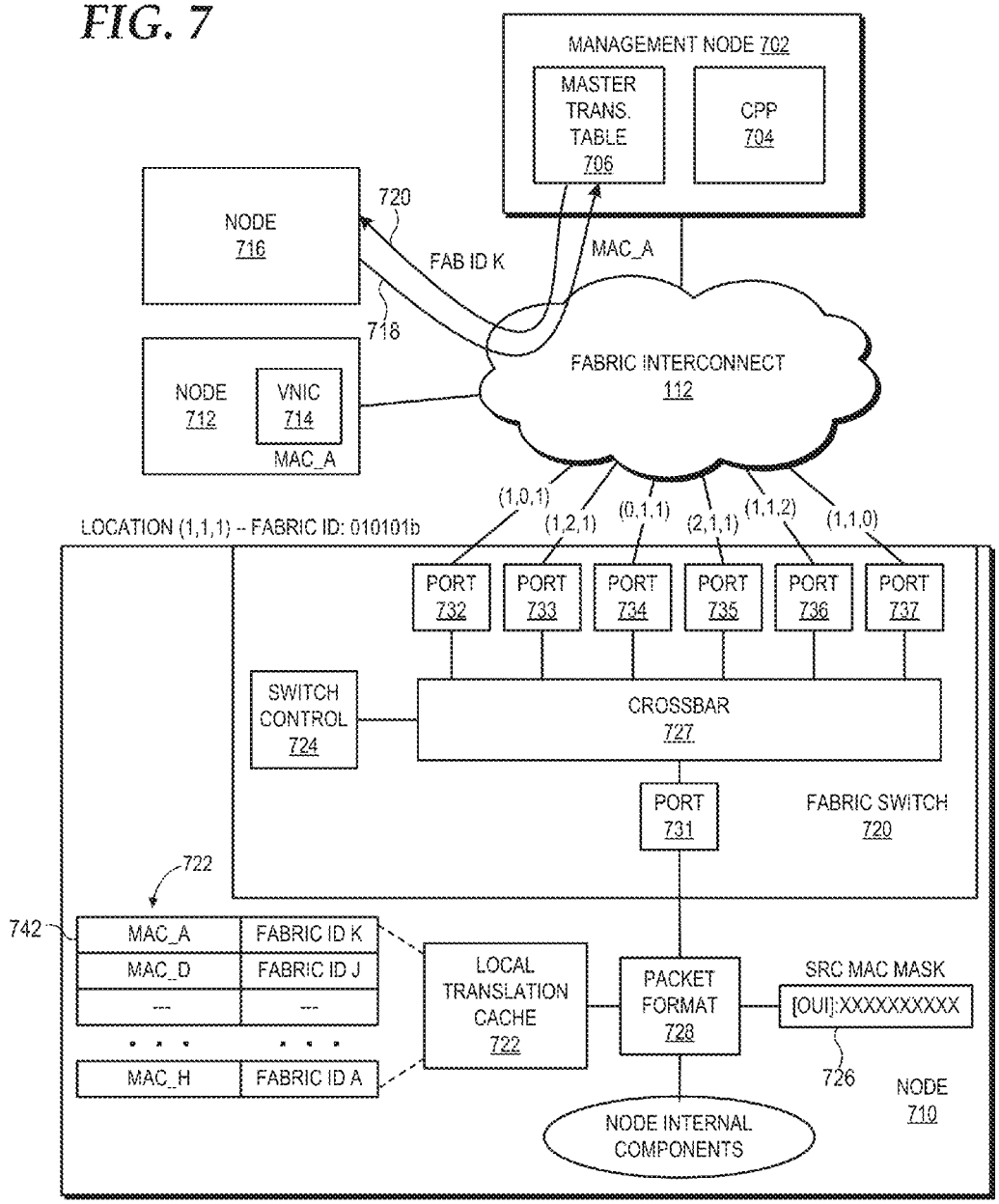
FIG. 7 is a block diagram illustrating an example implementation of distributed data link layer address translation in a cluster compute server in accordance with some embodiments.

FIG. 7 illustrates a distributed link layer address translation system for the server 100 in accordance with some embodiments. As briefly described above with reference to FIG. 4, instantiation of a VNIC or other situations may result in the use in the server 100 of a non-SRC MAC address that does not directly represent the network location of the node associated with the non-SRC MAC address and which does not directly control the source routing or identify the source routed path to be used for packets addressed to the node. In implementations whereby the link layer switches of the fabric 122 use the network location-identification feature of SRC MAC addresses to forward packets through the fabric 122 in accordance with a source routed path, these non-SRC MAC addresses cannot be directly used by the link layer switches for forwarding decisions. The distributed link layer address translation system facilitates the translation of these non-SRC MAC addresses to corresponding fabric IDs or other location identifiers so that packets addressed to non-SRC MAC addresses can be efficiently source routed in the fabric 122.

In the depicted example, the server 100 employs a management node 702 comprising a control plane processor 704. In some embodiments, the management node 702 is implemented as part of a network node of the server 100. The control plane processor 704 (also commonly referred to as a networking processor) maintains control plane information for the server 100, including maintaining routing table information, maintaining network mapping, participating in routing protocols, configuring static or otherwise source routed paths between nodes, assigning SRC MAC addresses to FRUs as they are swapped into the server 100, and the like. As part of this control plane management process, the control plane processor 704 maintains a master translation table 706. In the illustrated implementation, the master translation table 706 is entirely implemented at the management node 702. However, in some embodiments the master translation table 706 may be distributed over two or more management nodes. Further, each management node may be assigned to a corresponding subset of the nodes of the server 100, and thus each management node may maintain a master translation table solely for the subset of nodes under its management.

The master translation table 706 comprises a content addressable memory (CAM) or other storage structure that stores link address translations for the server 100 (or subset thereof). Thus, when a non-SRC MAC address is instantiated, assigned, or otherwise identified as used with respect to the fabric 122 of the server 100, the control plane processor 704 initializes an entry in the master translation table 706 for a mapping of the non-SRC MAC address to a fabric ID associated with the network location of the node associated with the MAC address. In some embodiments, the network location of each node is represented by a value stored at the NIC-specific field 432 (FIG. 4) of the SRC MAC address assigned to the node, and thus the fabric ID can be implemented as a portion of the SRC MAC address assigned to the node. For example, in an example implementation whereby the last six bits of the SRC MAC address represent the position tuple (x,y,z) of a location in a 3×3 torus network, the fabric ID can comprise, for example, the last six bits of the SRC MAC address assigned to the node associated with the detected non-SRC MAC address.

The control plane processor 704 can identify the use of a non-SRC MAC address in a variety of ways. In some embodiments, the control plane processor 704 snoops the fabric 122 to identify previously-unknown non-SRC MAC addresses. In some embodiments, a previously-unknown non-SRC MAC address is identified by the control plane processor 704 in response to a miss at the master translation table 706. To illustrate, a compute node 712 having fabric ID K may instantiate a VNIC 714 with an assigned non-SRC MAC address MAC_A by virtualization software executing at the compute node 712. A compute node 716 may attempt to communicate with the VNIC 714 by forming a packet with a destination MAC address of MAC_A. In this example, the local translation cache of the compute node 716 does not have an entry that provides the mapping of the MAC address MAC_A to the corresponding fabric ID, and thus the compute node 716 issues a cache miss 718 for the missing translation to the management node 702. In response to the cache miss 718, the control plane processor 704 performs a table look-up in the master translation table 706. In this example, the translation is also not present in the master translation table 706, and thus there is a miss on the master translation table 706. In response, control plane processor 704 initiates a translation discovery process. In some embodiments, this process is performed in a manner similar to the L2 MAC learning process in conventional L2 switches. The control plane processor 704 broadcasts a discovery packet throughout the server 100 and when the response from the node 712 returns with its fabric ID K, the control plane processor 704 populates the master translation table 706 with the MAC_A-to-fabric ID K link layer translation and, in turn, transmits this link layer translation back to the local translation cache of the original requesting compute node 716 as a cache update 720.

Alternatively, in some embodiments, the fabric interface device 406 (FIG. 4) or other component of a node that has initiated use of a non-SRC MAC address reports the use of the new non-SRC MAC address to the management node 702. To illustrate, in response to the instantiation of the VNIC 714 at the compute node 712, the fabric interface device of the compute node 712 can transmit to the management node 702 a message that includes an identifier of the non-SRC MAC address MAC_A and an identifier of the fabric ID K of the node 712. In response to the message, the control plane processor 704 generates an entry in the master translation table 706 to store the link layer translation associating non-SRC MAC address MAC_A with fabric ID K.

In response to detecting that a non-SRC MAC address has ceased to be used by a node (e.g., the node terminates the VNIC associated with a non-SRC MAC address), either via an explicit termination message from the node or via an aging or timeout mechanism, the control plane processor 704 removes the entry associated with the terminated non-SRC MAC address from the master translation table 706. In particular, if the destination MAC address is associated with an external (i.e., non-SRC) host interface, then the network node performs the ageing process to eventually remove the corresponding translation from the master translation table 706. However, if the destination MAC address is of an internal compute node, then the translation remains in the entry until the master translation table 706 is full, at which point the oldest entry is removed to make room for a new translation entry.

In some embodiments, a full copy of the master translation table 706 can be maintained at each node so as to facilitate source routing in the fabric 122. However, the number of nodes in the server 100 and the number of non-SRC MAC addresses employed in the server 100 may require storage capabilities in excess of what is intended for the fabric interfaces of the nodes of the server 100. Accordingly, in some embodiments, the server 100 employs a distributed translation system whereby local caches of subsets of the link address translations are maintained at the nodes. Each node comprises a local translation cache that stores only those link address translations relevant to that node. The local translation cache is updated in response to cache misses by querying the master translation table 706 for the corresponding link address translation. Thus, the local translation cache can be built up as the node employing the local translation cache encounters packets having as destination MAC addresses those non-SRC MAC address that the node has not encountered previously. Moreover, by using cache eviction techniques and other cache maintenance processes, the storage requirements for the local translation cache can be significantly less than that for the entire master translation table 706, thereby enabling a lightweight fabric switch that consumes less power and floor space. To illustrate, the size of the local translation cache of a node is dictated primarily by the number of conversations being conducted by the node with other host interfaces at other nodes, which is generally a relatively small number, whereas the master translation table 706 stores all of the MAC addresses of internal nodes as well as external MAC addresses from the entire server 100.

Node 710 of FIG. 7 illustrates an example implementation of this local translation caching technique. The node 710 can comprise a compute node, a peripheral resource node, a management node, and the like. In the depicted example, the node 710 includes a fabric switch 720 (corresponding to fabric switches 420, 520, and 620), a switch control 724, a crossbar switch 727, and ports 731, 732, 733, 734, 735, 736, and 737. The port 731 is connected to a packet formatter 728, which in turn is connected to the internal components of the node 710, and the ports 732-737 are connected to corresponding links of the fabric interconnect 112. The crossbar switch 727 forwards packets (or, more specifically, forwards flits that together represent a packet) between the ports 731-737 based on control signaling received from switch control 724. The switch control 724 determines which of the ports 731-737 is to serve as the egress port for a received packet based on the network location of the node associated with the destination MAC address of the packet and based on deterministic routing logic. For this example, it is assumed that node 710 is at location (1,1,1) in the torus network 200 of FIG. 2, and thus ports 732, 733, 734, 735, 736, and 737 are coupled to the nodes at locations (1,0,1), (1,2,1), (0,1,1), (2,1,1), (1,1,2), and (1,1,0), respectively.

The packet formatter 728 includes a SRC MAC mask 726 and a local translation cache 722. The SRC MAC mask 726 stores the OUI value used to identify MAC addresses as SRC MAC addresses, and may be a fixed value (e.g., set via fuses or a one-time-programmable register) or may be a value programmable by software. The local translation cache 722 comprises, for example, an N-way set associate cache implementing a plurality of entries, each entry having an index field to store a non-SRC MAC address (or a portion thereof) and a map field to store the corresponding fabric ID. For example, an entry 724 of the local translation cache 722 includes a link layer address translation mapping the non-SRC MAC address MAC_A to the fabric ID K of the node 712.

Figure 8:
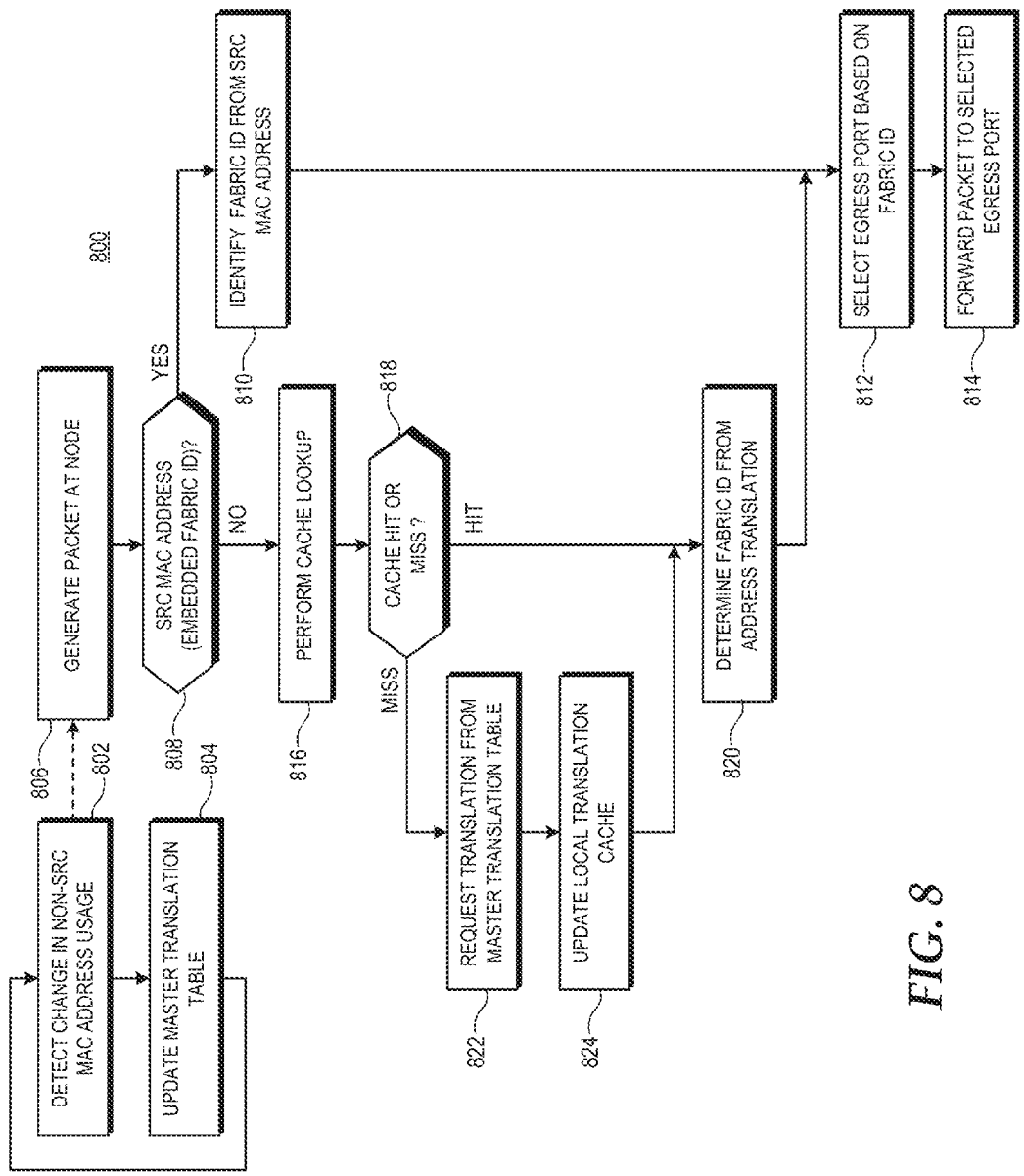
FIG. 8 is a flow diagram illustrating an example method of data link layer address translation in a cluster compute server in accordance with some embodiments.

FIG. 8 illustrates a method 800 of operation of the distributed link layer address translation system of FIG. 7 in greater detail in accordance with some embodiments. As noted above, the management node 702 monitors for instantiations of new non-SRC MAC addresses, termination of the use of non-SRC MAC addresses, and other changes in non-SRC MAC address usage. At block 802, the management node 702 detects such a change in the usage of a non-SRC MAC address, either through snooping or through indication of a miss from a local translation cache of a node. In response to detecting the change and determining the appropriate link layer translation, at block 804 the management node 702 updates the master translation table 706 to reflect the changed usage, either by inserting a new entry in response to the new use of a non-SRC MAC address, or by removing an entry in response to termination of use of a non-SRC MAC address. The process of blocks 802 and 804 may be repeated for each detected change in non-SRC MAC address usage.

In parallel with the process of blocks 802 and 804, the nodes of the server 100 route packet traffic in accordance with source routed rules implemented for the fabric 122. To initiate this source routing, the fabric ID of the destination node of a packet is identified at the source node and this fabric ID is inserted into the fabric header of the packet before the packet is provided to the fabric switch for output to the fabric interconnect 112. To this end, at block 806, the processor 402 (FIG. 4) generates a packet, which is provided to the packet formatter 728. At block 808, the packet formatter 728 accesses the destination MAC address of the packet and compares its OUI value to the OUI value stored in the SRC MAC mask 726 to determine the type of destination MAC address; that is, whether the destination MAC address is a SRC MAC address (that is, whether the destination MAC address has an embedded fabric ID).

In response to determining the destination MAC address is a SRC MAC address (as determined by the value in the OUI field 431 (FIG. 4) matching the OUI value of the SRC MAC mask 726), at block 810 the packet formatter 728 determines the fabric ID of the destination node from the destination MAC address and inserts the identified fabric ID into the fabric header of the packet as the destination fabric ID. The fabric ID can, for example, comprise N bits at a NIC-specific field of the SRC MAC address (e.g., the last N bits), whereby the N bits represent the position tuple (x,y,z) of the node in the 3D torus network 200 (FIG. 2).

With the fabric ID of the destination node determined, at block 812 the switch control 724 identifies the port connected to the next hop node in the source routed path between the node 710 and the destination node based on the fabric ID and source routed rules and at block 814 the switch control 724 manipulates the crossbar switch 727 to forward the packet to the identified egress port for transmission over the corresponding link.

Returning to block 808, in response to determining the destination MAC address of the packet is a non-SRC MAC address (as determined by the value in the OUI field 431 (FIG. 4) not matching the OUI value of the SRC MAC mask 726), the packet formatter 728 performs a lookup in the local translation cache 722 for a link layer address translation for the destination MAC address at block 816. In response to a cache hit (that is, the local translation cache 722 currently stores the sought-after link layer address translation) at block 818, the packet formatter 728 accesses the cached link layer address translation and determines the fabric ID corresponding to the destination MAC address from the translation at block 820. The packet formatter 728 then inserts the identified fabric ID into the fabric header of the packet as the destination fabric ID for the packet. The flow then returns to block 812, whereupon the packet is provided to the fabric switch 720 and the switch control 724 identifies an egress port based on the accessed fabric ID and source routing rules, and then forwards the packet to the identified egress port via the crossbar switch 727 at block 814.

Returning to block 818, in response to determining a cache miss (that is, the local translation cache 722 does not currently store the sought-after link layer address translation), at block 822 the packet formatter 728 generates a translation request message and forwards the translation request message to the management node 702 via the fabric 122. The translation request message typically includes at least a portion of the non-SRC MAC address at issue. In response, the management node 702 indexes the master translation table 706 based on the supplied non-SRC MAC address portion to obtain the requested link layer address translation and then provides the requested link layer address translation to the fabric switch 720. In response to receiving the requested link layer address translation, the switch control 724 updates the local translation cache 722 with the link layer address translation. The flow then turns to block 820, whereupon the packet formatter 728 accesses the cached link layer address translation and determines the fabric ID corresponding to the destination MAC address from the translation. The identified fabric ID is inserted into the packet as the destination fabric ID as noted above. The packet is provided to the fabric switch 720 and, at block 812 the switch control 724 identifies the port based on the accessed fabric ID, and forwards the packet to the identified egress port via the crossbar switch 727 at block 814.

Figure 9:
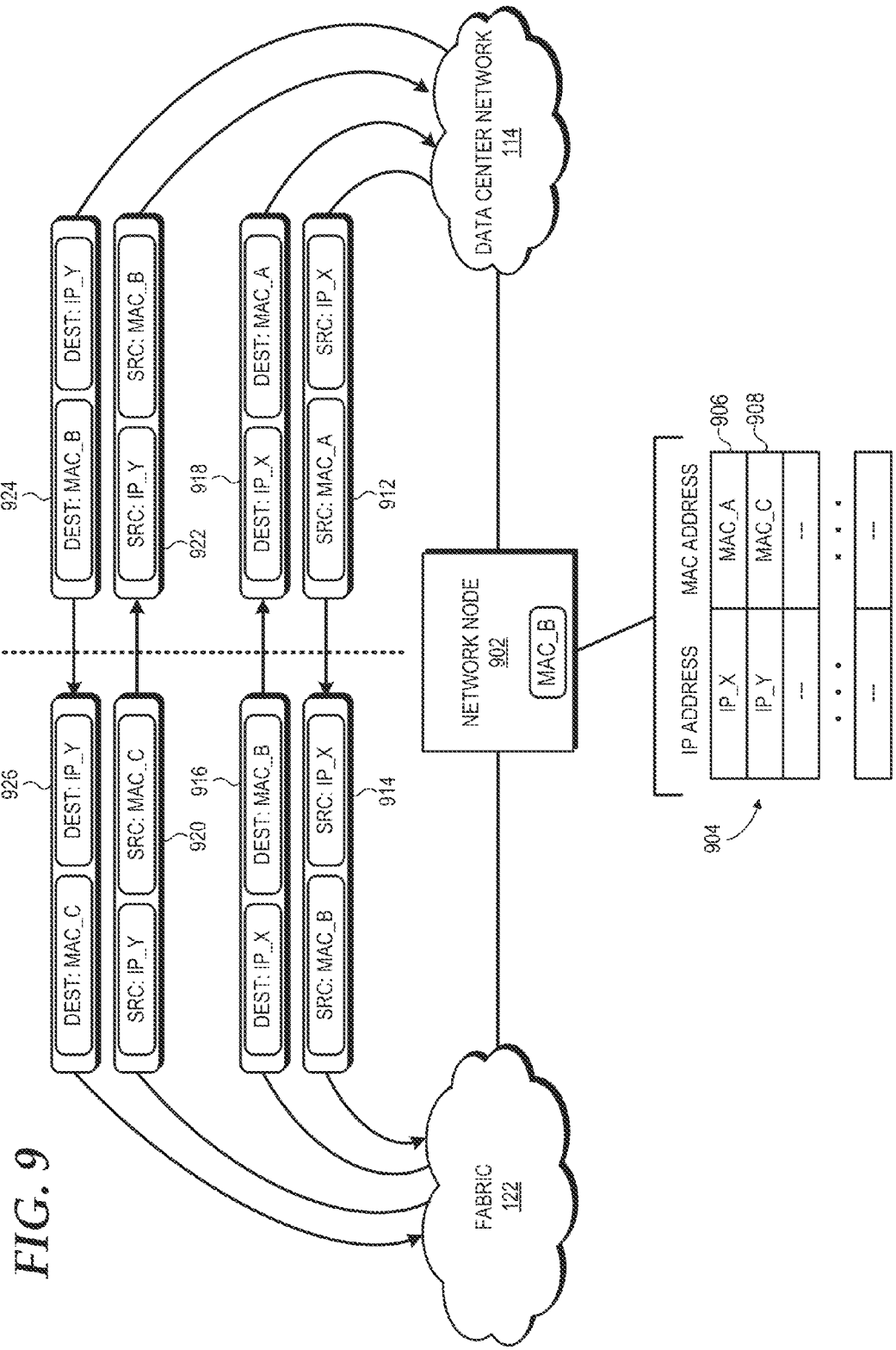
FIG. 9 is a diagram illustrating an example method for data link layer address obfuscation in a cluster compute server in accordance with some embodiments.

FIG. 9 illustrates a technique for link layer address obfuscation for the server 100 in accordance with some embodiments. This link layer address obfuscation technique can be employed together with, or independent of, the distributed link layer address translation technique of FIGS. 7 and 8.

As described above, network nodes, such as the network node 902 of FIG. 9, operate as the bridge between the internal network of the server 100 and one or more external networks, such as the data center network 114. Because packets are routed in the fabric 122 of the server 100 using the SRC MAC addresses with embedded fabric IDs, the network node 902 can simplify routing operations by ensuring that externally-sourced packets are addressed with SRC MAC addresses. To this end, the network node 902 is configured to maintain an internal/external mapping table 904 to facilitate this translation. The network node 902 is assigned a SRC MAC address, MAC_B, that represents the network location of the network node 902 in the server 100. Accordingly, when an inbound packet 912 is received from an external network, the network node 902 replaces the source MAC address MAC_A of the packet 912 with the SRC MAC address MAC_B of the network node 902 while maintaining the original source Internet Protocol (IP) address IP_X of the packet. The network node 902 then forwards the resulting modified packet 914 on to the next hop node in the fabric 122.

Concurrently, the network node 902 creates an entry 906 in the internal/external mapping table 904 to reflect the mapping between the source IP address IP_X and the source MAC address MAC_A. Accordingly, when a node replies to the modified packet 914 with an outbound packet 916 having the IP address IP_X as its destination IP address and the MAC address MAC_B as the destination MAC address, the network node 902 access the entry 906 of the internal/external mapping table 904 to determine that the MAC address MAC_A is associated with the IP address IP_X, and thus the network node 902 replaces the MAC address MAC_B with the MAC address MAC_A as the destination MAC address and forwards the resulting modified packet 918 to the data center network 114.

A similar approach is taken by the network node 902 for packet flows initiated internally (that is, by a node of the server 100). In response to receiving a packet 920 having an MAC address MAC_C of a node as its source MAC address and an IP address IP_Y as its source IP address, the network node 902 replaces the MAC address MAC_C with its own MAC address MAC_B while maintaining the original source IP address IP_Y. The network node 902 then forwards the resulting modified packet 922 to the data center network 114.

Concurrently, the network node 902 creates an entry 908 in the internal/external mapping table 904 to reflect that the IP address IP_Y is associated with the SRC MAC address MAC_C. Thus, when the data center network 114 replies to the modified packet 922 with a packet 924 having the IP address IP_Y as its destination IP address and having the MAC address MAC_B as its destination MAC address, the network node 902 accesses the entry 906 of the internal/external mapping table 904 to determine that the IP address IP_Y maps to the SRC MAC address MAC_C. Accordingly, the network node 902 replaces the MAC address MAC_B with the SRC MAC address MAC_C as the destination MAC address and then forwards the resulting modified packet 926 to the fabric 122 for routing to the node located at the network location represented by the SRC MAC address MAC_C.

In this approach of replacing the source MAC address of incoming packets with its own SRC MAC address, the network node 902 can obfuscate the MAC addresses of external nodes communicating with the server 100. Likewise, by replacing the source MAC address of outgoing packets with its own SRC MAC address, the network node 902 can obfuscate the MAC addresses of internal nodes communicating with the data center network 114. Moreover, because this approach results in the use of SRC MAC addresses for packet communications between the network node 902 and the other nodes of the server 100, a reduced number of link layer address translations can be cached at the nodes of the server 100. In particular, if the server 100 does not employ virtualization or other processes that may result in the instantiation of non-SRC MAC addresses within the server 100, this MAC address substitution technique may permit the other nodes of the server 100 to forgo local translation caching entirely.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions described above. In some embodiments, the apparatus and techniques described above are implemented in a system comprising one or more integrated circuit (IC) devices (also referred to as integrated circuit packages or microchips), such as certain components of the server 100 (e.g., the fabric interface device or the compute node) described above with reference to FIGS. 1-9. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 10:
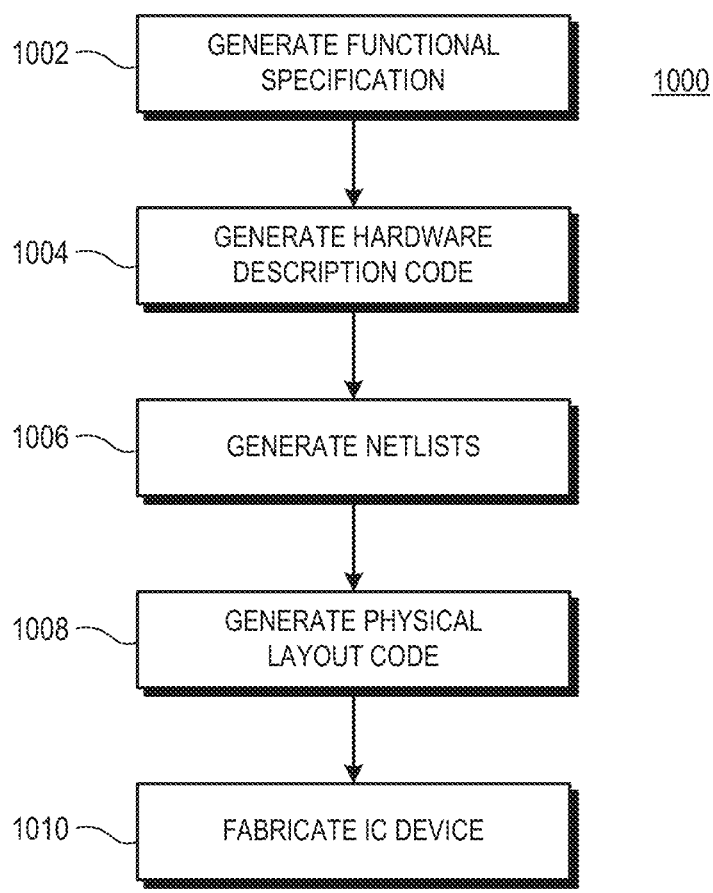
FIG. 10 is a flow diagram illustrating a method for designing and fabricating an integrated circuit (IC) device in accordance with some embodiments.

FIG. 10 is a flow diagram illustrating an example method 1000 for the design and fabrication of an IC device implementing one or more aspects. As noted above, the code generated for each of the following processes is stored or otherwise embodied in computer readable storage media for access and use by the corresponding design tool or fabrication tool.

At block 1002 a functional specification for the IC device is generated. The functional specification (often referred to as a micro architecture specification (MAS)) may be represented by any of a variety of programming languages or modeling languages, including C, C++, SystemC, Simulink™, or MATLAB™.

At block 1004, the functional specification is used to generate hardware description code representative of the hardware of the IC device. In at some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1006 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1008, one or more EDA tools use the netlists produced at block 1006 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1010, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A cluster compute server comprising:
a network of nodes coupled in a network topology via a fabric, each node having a location identifier of a location of the node in the network topology and wherein packets are source routed within the fabric based on the location identifier;
each node of a set of nodes of the network comprising a corresponding local translation cache, the local translation cache storing one or more link layer address translations in use by the corresponding node, each link layer address translation representing a mapping of a corresponding link layer address to a location identifier in the network topology,
a management node storing at least a portion of a master translation table of the link layer address translations implemented in the network of nodes;
wherein in response to a node generating a packet, the node is to access the local translation cache to obtain a link layer address translation associated with a destination link layer address for the packet; and
wherein the node is to query the management node for the link layer address translation associated with the destination link layer address in response to the local translation cache not including the link layer address translation.

2. The cluster compute server of claim 1, wherein, in response to associating a link layer address with a host interface at a node, the management node is to store a link layer address translation representing a translation of the link layer address assigned to the host interface and a location identifier for a location of the node in the network topology.

3. The cluster compute server of claim 2, wherein:
each node in the network is associated with a corresponding media access control (MAC) address comprising a first field with a value representing the location identifier of the node and a second field with a first value common to the locations of nodes of the network of nodes in the network topology, wherein a set of bits of the value of the first field represents source routing control for packets to the location within the fabric; and
the link layer address assigned to the host interface comprises a MAC address comprising the first field with a value specific to the host interface and the second field with a second value different than the first value.

4. The cluster compute server of claim 3, wherein:
the network topology comprises a three-dimensional torus; and
each of a first subset, second subset, and third subset of the set of bits of the first field of the MAC address identifies a position of the location in each of a first dimension, second dimension, and third dimension, respectively, of the three-dimensional torus.

5. The cluster compute server of claim 1, wherein:
the network topology comprises a three-dimensional torus; and
each of a first subset, second subset, and third subset of bits of a location identifier identifies a position of the corresponding location in each of a first dimension, second dimension, and third dimension, respectively, of the three-dimensional torus.

6. The cluster compute server of claim 5, wherein the fabric is to route a packet by completely traversing a route path of the packet in one dimension of the three-dimensional torus before routing the packet to another dimension of the three-dimensional torus.

7. A field replaceable unit (FRU) comprising:
a printed circuit board (PCB) comprising a socket interface to couple with a socket of a fabric connecting a plurality of nodes in a network topology, each node having a location identifier of a corresponding location of the node in the network topology and wherein packets are source routed within the fabric based on the location identifier;
a fabric interface disposed at the PCB, the fabric interface comprising:
  a local translation cache to store link layer address translations that represent mappings of link layer addresses to corresponding location identifiers in the network topology; and
  a packet formatter to provide destination location identifiers for packets generated at the FRU based on the link layer address translations of the local translation cache;
wherein each node is associated with a corresponding media access control (MAC) address having a first field comprising a first value common to each location in the network topology and a second field comprising a value representative of the location identifier of the node; and
wherein the fabric interface is to:
  responsive to the FRU generating a packet having a destination MAC address having a value other than the first value in the first field, access a link layer address translation from the local translation cache based on the destination MAC address and determine a location identifier associated with the location of an intended destination node for the packet using the link layer address translation;
  access the link layer address translation from a master translation table of link layer address translations at a management node connected to the fabric responsive to the local translation cache not containing the link layer address translation; and
  forward the packet to a selected port of a set of ports connected to the fabric, the port selected based on a source routing path indicated by the location identifier.

8. The FRU of claim 7, wherein the fabric interface further is to:
responsive to the FRU generating a packet having a destination MAC address having the first value in the first field, forward the packet to a port of the set of ports selected based on a source routing path indicated by a value stored at the second field of the destination MAC address.

9. The FRU of claim 7, wherein:
the network topology comprises a three-dimensional torus; and
each of a first subset, second subset, and third subset of bits of a location identifier identifies a position of the corresponding location in each of a first dimension, second dimension, and third dimension, respectively, of the three-dimensional torus.

10. The FRU of claim 9, wherein each node is associated with a corresponding media access control (MAC) address having a first field with a value common to each location in the network topology and a second field with a value representing the location identifier of the node, the value at the second field comprising a first subset, a second subset, and a third subset of bits that identify a position of the corresponding location in each of a first dimension, second dimension, and third dimension, respectively, of the three-dimensional torus.

11. A method of operating a cluster compute server comprising a fabric connecting a plurality of nodes in a network topology, each node having a location identifier in the network topology and wherein packets are source routed within the fabric based on the location identifier, the method comprising:
maintaining, at each node of a set of nodes, a local translation cache of link layer address translations, each link layer address translation mapping a corresponding link layer address to a location identifier for a corresponding location in the network topology;
maintaining, at a management node, at least a portion of a master translation table of the link layer address translations implemented in the nodes;
in response to a node generating a packet with a destination link layer address that does not represent the corresponding location of a destination node in the network topology, accessing the local translation cache at the node to obtain a link layer address translation associated with a destination link layer address for the packet, wherein accessing a link layer address translation from the local translation cache comprises requesting the link layer address translation from the master translation table in response to a cache miss for the link layer address translation;
determining a location identifier of a destination node of the packet based on the link layer address translation; and
forwarding the packet to an egress port of the node based on the location identifer of the destination node.

12. The method of claim 11, wherein forwarding packets at the node comprises:

in response to the node generating a packet with a destination link layer address that represents the corresponding location of the destination node in the network topology, determining the location identifier of the destination node from a value stored at a first field of the destination link layer address.

13. The method of claim 12, further comprising:
determining, at the node, whether the destination link layer address represents the corresponding location of the destination node based on a comparison of a specified value to a value stored at a second field of the destination link layer address.

14. The method of claim 11, further comprising:
in response to associating a link layer address with a host interface of a node, storing to the master translation table a link layer address translation representing a translation of the link layer address assigned to the host interface and a location identifier for a location of the node in the network topology.

15. The method of claim 14, wherein:
each node in the network is associated with a corresponding media access control (MAC) address comprising a first field with a value representing the location identifier of the node and a second field with a first value common to the locations in the network topology, wherein a set of bits of the value of the first field represents source routing control for packets to the location within the fabric; and the link layer address assigned to the host interface comprises a MAC address comprising the first field with a value specific to the host interface and the second field with a second value different than the first value.

16. The method of claim 15, wherein:
the network topology comprises a three-dimensional torus; and
each of a first subset, second subset, and third subset of the value of the first field of the MAC address identifies a position of the location in each of a first dimension, second dimension, and third dimension, respectively, of the three-dimensional torus.

17. The method of claim 11, wherein:
the network topology comprises a three-dimensional torus; and
each of a first subset, second subset, and third subset of bits of a location identifier identifies a position of the corresponding location in each of a first dimension, second dimension, and third dimension, respectively, of the three-dimensional torus.

\* \* \* \* \*